United States Patent [19]
Wethered

[11] Patent Number: 5,876,157
[45] Date of Patent: Mar. 2, 1999

[54] DRILL CENTERING JIG AND FORMING TOOL GUIDE

[76] Inventor: William Wethered, 602 NE. Blair Rd., Washougal, Wash. 98671

[21] Appl. No.: 896,889

[22] Filed: Jul. 18, 1997

Related U.S. Application Data

[60] Provisional application No. 60/021,935 Jul. 17, 1996.
[51] Int. Cl.$^6$ .................................................. B23B 45/14
[52] U.S. Cl. ....................................... 408/104; 408/115 B
[58] Field of Search .................................. 408/104–107, 408/110, 115 R, 115 B

[56] References Cited

U.S. PATENT DOCUMENTS

| | | |
|---|---|---|
| 100,772 | 3/1870 | Kelly . |
| 228,249 | 6/1880 | Dimsey . |
| 579,037 | 3/1897 | Bulock et al. . |
| 673,689 | 5/1901 | Reil . |
| 730,123 | 6/1903 | Hudson . |
| 1,292,620 | 1/1919 | Luers . |
| 1,630,083 | 5/1927 | Hinckley et al. ...................... 408/106 |
| 2,209,021 | 7/1940 | Hawker . |
| 2,242,792 | 5/1941 | Panzer . |
| 3,099,173 | 7/1963 | Paslawsky et al. . |
| 3,199,380 | 8/1965 | Threlkeld . |
| 3,205,734 | 9/1965 | Headley et al. ....................... 408/106 |
| 3,224,021 | 12/1965 | Curran . |
| 4,319,503 | 3/1982 | Saine et al. ............................ 408/104 |

FOREIGN PATENT DOCUMENTS 604748  10/1924  France .

Primary Examiner—Steven C. Bishop
Attorney, Agent, or Firm—R. Reams Goodloe, Jr.

[57] ABSTRACT

A drill and forming tool centering jig. The tool is useful centering a drill, bit body, or forming tool with respect to a workpiece shaft face in which a bore is to drilled or a surface is to be shaped. The tool has a generally cylindrical tubular body having a first threaded end portion with external threads thereon, and a second, bushing end opposite thereto. Within the body are secured a first collet and a second collet. A collet compressor to inwardly urges the inner reaches of both collets radially inward toward the outer surface of the workpiece when a jam nut assembly is threadably engaged and tightened on the external threads on the threaded end portion of the body. A bushing is provided to be slideably engaged with and secured in the body. Within the bushing, a forming tool is provided that is adapted to slidingly engage and rotate within the bushing. The forming tool is adapted to shape a working face of a workpiece shaft that is brought into engagement with the forming tool. Circumferential grooves are provided for locating snap rings within the body and in the jam nut assembly, and the combination of snap rings, bearings, and bushings are utilized to secure the collets, and the workpiece which they hold, in a secure working relationship.

14 Claims, 4 Drawing Sheets

DRILL CENTERING JIG AND FORMING TOOL GUIDE

This Application claim benefit of provisional Application No. 60/021,935 filed Jul. 17, 1996.

FIELD OF THE INVENTION

My invention relates to a device for drilling centered bores in shafts, particularly in wooden shafts such as pool or billiard cues.

BACKGROUND

It is often desirable to place new tips on pool cues, or to join cue handles and cue shafts to form a complete cue stick. This occurs because new tips may be necessary or desirable, or because it may be necessary or desirable to replace the shaft end of a cue stick which has become undesirable for use. Some systems for providing replacement of cue tips or for joining cue handles and cue stick shafts require that precise diameter bores be placed into wooden cue shafts. Also, such systems require in some cases that bores be tapped for insertion of threaded hardware which is used in creating tightfitting, secure joints. Therefore, it is desirable that a device which is capable of providing precise, centered boreholes be available, in order to adequately implement the use of improved replaceable tip systems and novel joint systems for cues.

Although various devices are known for centering wooden shafts for drilling along the central axis thereof, such devices which are known to me have various drawbacks, and are generally susceptible to certain problems, including inadequate adaptation to the unique shape and variable size of pool cues. Other systems are sufficiently complicated that it is difficult to provide the devices inexpensively enough to interest large segments of the market for such devices. As a consequence, it is still desirable to improve upon the apparatus and upon the methods which have been used heretofore for centering and drilling boreholes in selected sections of cue sticks.

SUMMARY

I have now developed a novel, useful, and innovative tool for centering a drill or a bit body with respect to a workpiece shaft in which a bore is to drilled or a surface is to be shaped. The tool has a generally cylindrical tubular body having a first threaded end portion with external threads thereon, and a second, bushing end opposite thereto. Within the body are secured a first collet and a second collet, and a collet compressor to inwardly urge the inner reaches of both collets toward the outer surface of the workpiece, when a jam nut assembly which is threadably engages the external threads on the threaded end portion of the body is tightened. A bushing is provided to be slideably engaged with and secured in the body. Within the bushing, a forming tool is provided that is adapted to slidingly engage and rotate within the bushing. The forming tool is adapted to shape a working face of a workpiece shaft that is brought into engagement with the forming tool. Ideally, the forming tool further includes at the working end a drill bit receiving bore, in which a bit can be secured for use in drilling an axial bore along the centerline of the workpiece shaft. For securing the bushing and the forming tool, a locking handle is provided to be inserted through an aperture in the body to threadably engage the bushing, so as to lock the bushing into a stationary, working position with respect to said body. Circumferential grooves are provided for locating snap rings within the body and in the jam nut assembly, and the combination of snap rings, bearings, and bushings are utilized to secure the collets, and the workpiece which they hold, in a secure working relationship.

OBJECTS, ADVANTAGES, AND NOVEL FEATURES

I have now invented, and disclose herein, a novel device for providing a centered borehole in a cue stick. My new device does not have the drawbacks common to those somewhat similar products heretofore used of which I am aware. Unlike the earlier designs, my drill centering jig and forming tool guide is simple, lightweight, relatively inexpensive and easy to manufacture, and otherwise superior to those designs heretofore used or proposed. In addition, it provides a significant, additional measure of ease in drilling boreholes in cue sticks.

From the foregoing, it will be apparent to the reader that one important and primary object of the present invention resides in the provision of a novel device for drilling boreholes in cue sticks.

Other important but more specific objects of the invention reside in the provision of a simple drill guide and jig as described herein which:

provide a secure holding device for securing a cue stick in place while drilling a central borehole;

can be manufactured in a simple, straightforward manner of readily available hardware and machinable parts;

which in a relatively inexpensive manner can be used to improve the speed and efficiency of (a) interchanging cue stick shaft portions with cue stick handle portions, or (b) replacing cue tips when using my unique tip replacement hardware and methods.

Other important objects, features, and additional advantages of my invention will become apparent to the reader from the foregoing and as the ensuing detailed description and discussion proceeds in conjunction with the accompanying drawing.

BRIEF DESCRIPTION OF DRAWING

FIG. 2A is a vertical end view of a collet used to secure a cue stick in my drill centering jig.

DESCRIPTION

Figure 1:
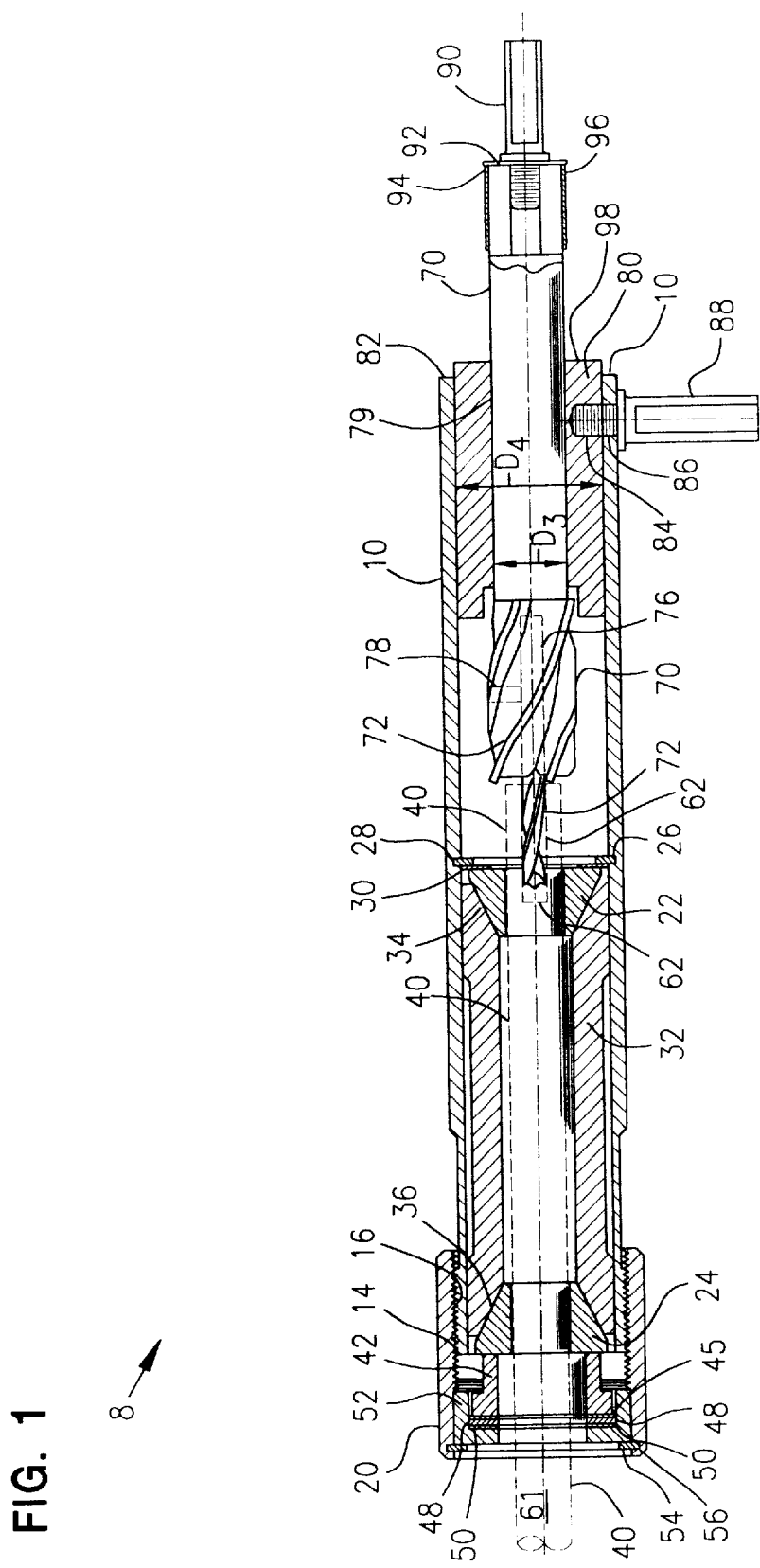
FIG. 1 is a partial vertical cross sectional view of my drill centering jig and forming tool guide.

Attention is directed to FIG. 1 of the drawing wherein my novel tool 8 for accurately centering and drilling boreholes in shafts such as cue sticks is illustrated. Tool 8 has a generally cylindrical shaped tubular body 10 with a threaded end portion 12 at the first end 14. The external threads 16 fit in meshing engagement with interior threads 18 in a jam nut assembly case 20.

Opposing generally conical shaped first and second collets 22 and 24, respectively, are provided interior to the body 10 and jam nut assembly case 20. Near the center of the body 10 of tool 8, a snap ring groove 26 is provided to locate therein a first snap ring 28. A washer 30 is provided between first snap ring 28 and the first collet 22. Then a substantially cylindrical fuse shaped collet compressor 32 is provided. An inward sloping generally conical shaped first collet engaging surface 34, and an inward sloping, generally conical shaped second collet engaging surface 36 are provided in collet compressor 32 for compressing first inner ridges 37 and second inner ridges of 38 of collets 22 and 24, respectively against an incoming workpiece such as a cue stick 40 (shown in FIG. 1 in hidden lines; see also FIG. 6 below, for example).

Figure 2:
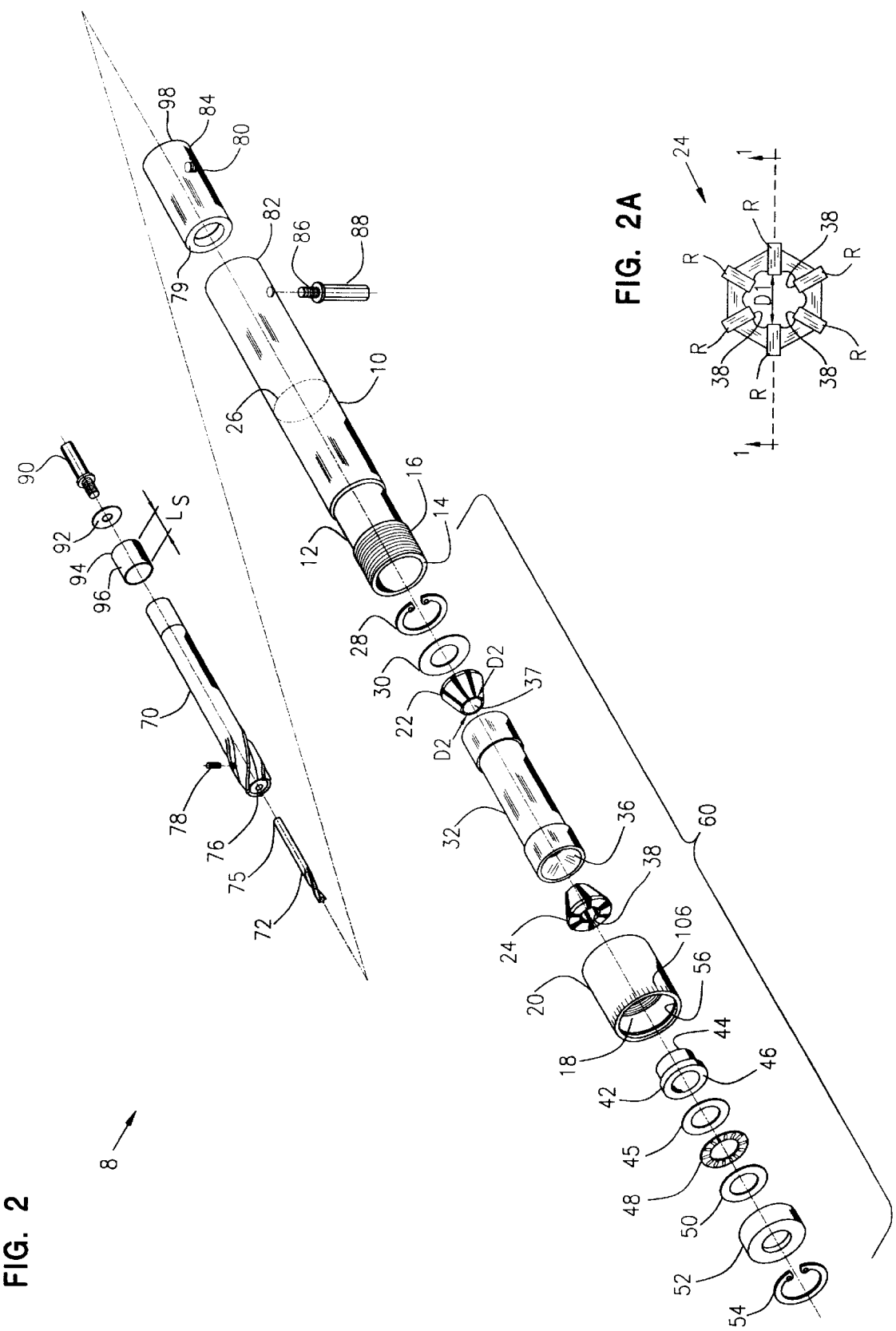
FIG. 2 is an exploded perspective view of my drill centering jig and forming tool guide, showing the various components and their assembly sequence.

To allow for compression of the collets 22 and 24, a generally L-shaped (in cross-section) inner retainer ring 42 has an inner surface 44 which engages the rear surfaces R of second collet 24. A flat, washer-like inner bearing race 45 engages the outer surface 46 of inner retainer ring 42 and allows the inner retainer ring 42 to freely turn with respect to thrust bearing 48. A flat, washer-like outer bearing race 50 allows the thrust bearing 48 to freely turn with respect to outer, L-shaped (in cross-section) retainer ring 52. Finally, snap ring 54 fits in groove 56 in jam nut assembly case 20 to hold the entire working assembly 60 (other than the case 20 itself) in place. This can be better appreciated by reference to FIG. 2.

For accommodating a tapered workpiece shaft, such as a pool cue, collet 24 has an inner diameter $D_1$ which is larger than inner diameter $D_2$ of the more distal collet 22. For many common cue stick sizes, a diameter $D_1$ of about 0.600 inches and a diameter $D_2$ of about 0.500 inches is adequate. I prefer to use compressible collets which are commercially available from the ORTLIEB Company, models J445 and J440, for collets 24 and 22, respectively.

Figure 3:
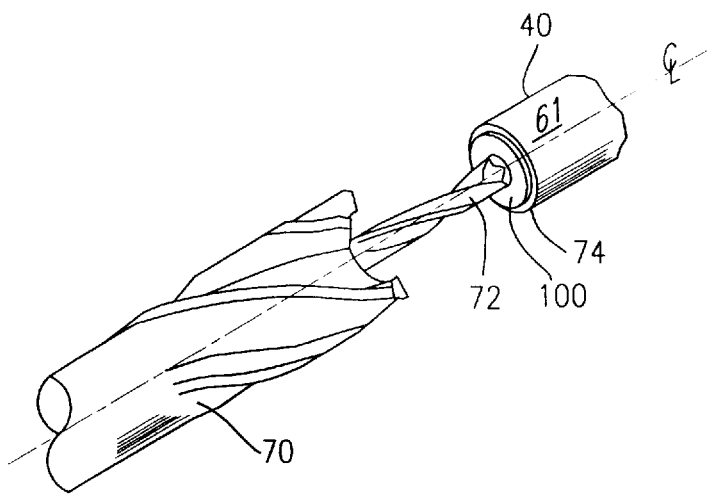
FIG. 3 is a partial perspective view of a preparation step in the method of using my novel device to bore holes in cue sticks and to prepare a cue stick end for receiving a tip.
Figure 4:
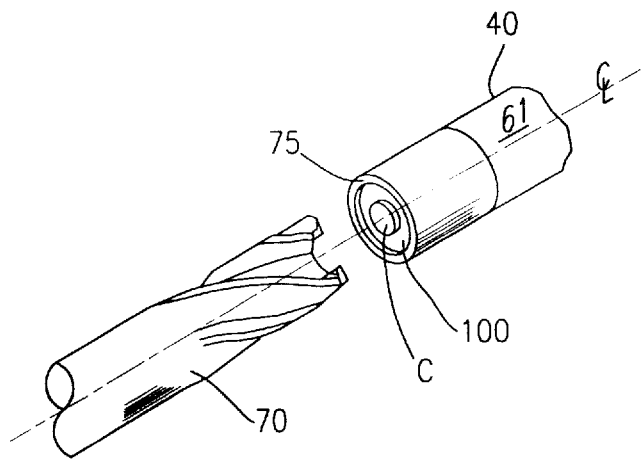
FIG. 4 is a partial perspective view of a preparation step in the method of using my novel tool to bore holes and to rout cue stick ends in preparation for receiving a cue tip.
Figure 5:
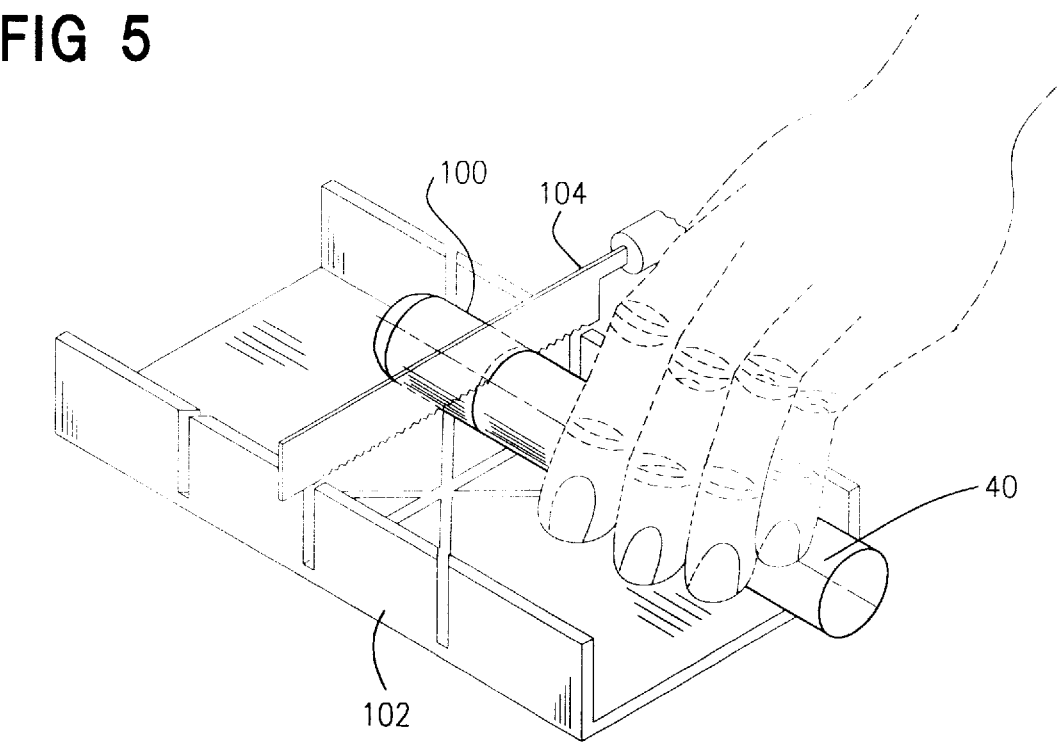
FIG. 5 is a perspective view of the preparation step of forming a clean, transverse surface face of a cue stick, prior to drilling a central borehole or routing the edges of the face.

Once the cue shaft 40 to be drilled is secured in place by tightening the jam nut assembly case 20 until the first 22 and second collets 24 grip the surface 61 of shaft 40, then drilling of a borehole 62 (shown in hidden lines) can begin. A forming tool 70 is provided which can accept a drill bit 72 of any preselected size. The forming tool 70 can be also selected to provide any desired shape on the end of shaft 40, such as an outer edge recessed shelf portion 74, as shown in FIG. 3 below, or an outer raised edge portion, as shown in FIG. 4 below. Also, as noted in FIG. 4, use of drill bit 72 can be avoided altogether, to leave a raised center C. In any event, shank end 75 of drill bit 72 is secured in the central drill accepting bore 76 of tool 70 via set screw 78. Then the drill bit 72 and form tool 70 are inserted through inner shaft 79 of diameter $D_3$ of bushing 80. Then bushing 80 with outer diameter $D_4$ is inserted into the bushing housing end 82 of tubular body 10. A threaded receiver 84 in bushing 80 receives threaded shaft portion 86 of the locking handle 88. The threaded shaft portion 86 is tightened until the form tool 70 is rotatably secured in the body 10.

Drill chuck 90 is provided for turning the form tool 70 and drill 72 via a selected power drill (not shown). Retaining washer 92 is normally located between drill chuck 90 and the butt end 94 of sleeve 96. Sleeve 96 of length $L_S$ spaces the form tool 70 relative to rear 98 of bushing 80. Length $L_S$ can be varied to vary the penetration in workpiece 40 of drill 72.

Figure 6:
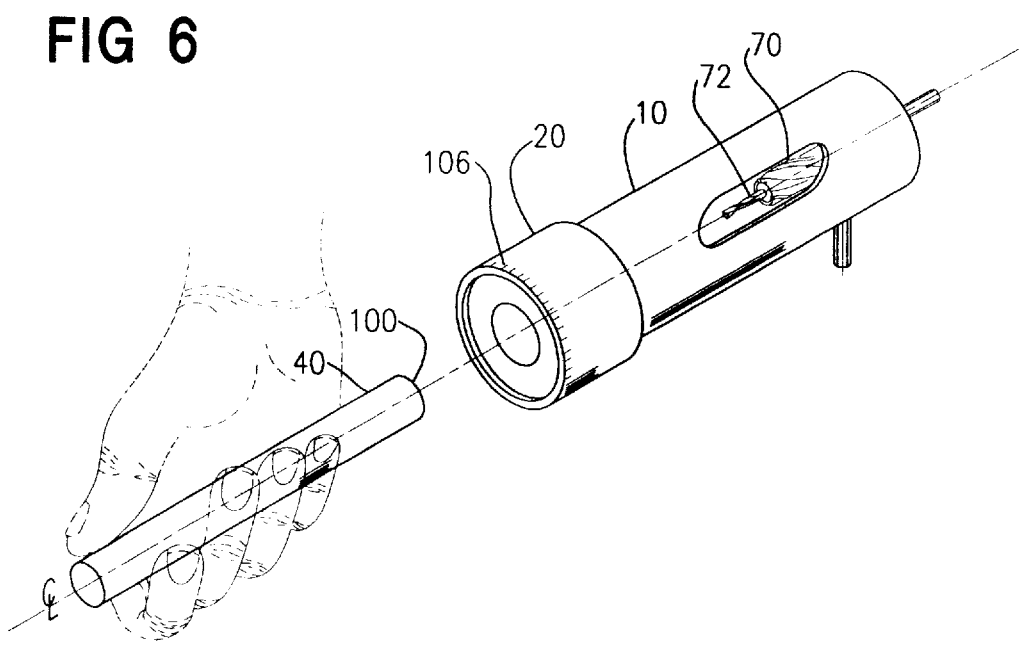
FIG. 6 is a perspective view of the step of inserting a cue stick end into my drill guide and jig apparatus, when preparing to use the apparatus for boring a centered hole in the cue.

The method of use of my novel tool 8 can be easily envisioned with reference to FIGS. 3, 4, 5 and 6. First, a cleanly cut and square end face 100 is provided for cue stick 40, via any convenient method such as using a mitre box 102 and saw 104 arrangement. Once a prepared, square end face 100 is ready, it is inserted through the jam nut assembly case 20 as seen in FIG. 6. Then the end 100 is pushed tight against the drill 72. At this point, the jam nut assembly casing 20 is tightened via knurled friction surface 106 to secure the cue stick 40 in the tool 8. A drill driver (not shown), preferably powered, is used to power the form tool 70 and drill bit 72. The borehole 62 of any desired size is provided in cue 40. If further forming of end 100 of cue 40 is desired, then the forming tool 70 is engaged to provide the appropriate surface, such as mentioned above (see FIGS. 4 and 5). I prefer to use a carbide cutter for a forming tool 70, to maintain a sharp cut in workpiece 40.

It is thus clear from the heretofore provided description that novel jig and drill centering tool, and the method of using the same, represent an appreciable improvement in the state of the art quickly and cleanly providing boreholes of desired sizes in shafts, and particularly, wooden cue shafts.

It will thus be seen that the objects set forth above, including those made apparent from the proceeding description, are efficiently attained, and, since certain changes may be made in carrying out the construction of a drill and forming tool centering jig, and in providing a method of shaping workpieces by employing the same, it is to be understood that the invention may be embodied in other specific forms without departing from the spirit or essential characteristics thereof. For example, while I have set forth an exemplary design for a drill and forming tool centering jig arrangement, many other embodiments are also feasible to attain the result of the principles of the method disclosed herein. Therefore, it will be understood that the foregoing description of representative embodiments of the invention have been presented only for purposes of illustration and for providing an understanding of the invention, and it is not intended to be exhaustive or restrictive, or to limit the invention to the precise forms disclosed.

The intention is to cover all modifications, equivalents, and alternatives falling within the spirit and scope of the invention as expressed in the appended claims. As such, the claims are intended to cover the structures and methods described therein, and not only the equivalents or structural equivalents thereof, but also equivalent structures or methods. Thus, the scope of the invention, as indicated by the appended claims, is intended to include variations from the embodiments provided which are nevertheless described by the broad meaning and range properly afforded to the language of the claims, or to the equivalents thereof.

I claim:

1. A tool for centering a drill with respect to a workpiece shaft in which a bore is to be formed, said tool comprising:
   (a) a tubular body, said body having (i) a first, threaded end portion with external threads thereon, and (ii) a second, bushing end opposite thereto;
   (b) a first collet and a second collet;
   (c) a collet compressor;
   (d) a jam nut assembly adapted to threadably engage said external threads on said threaded end portion of said body, wherein said jam jut assembly can be reversably tightened to engage and thereby compress said first and said second collet against a selected workpiece shaft, so as to secure said workpiece;
   (e) a bushing, said bushing adapted to slidably engage and securely fit inside said second, bushing end of said body.

2. The tool as set forth in claim 1, further comprising a forming tool, said forming tool adapted to slidingly engage and rotate within said bushing.

3. The tool as set forth in claim 2, wherein said workpiece shaft further comprises a transverse working face, and wherein forming tool further comprises a working end adapted to shape said working face of said workpiece shaft.

4. The tool as set forth in claim 3, wherein said forming tool further comprises, in said working end, a bit receiving bore.

5. The tool as set forth in claim 4, further comprising a drill bit, said drill bit having a shank end adapted to be slidably engaged into said bit receiving bore in said working end of said forming tool.

6. The tool as set forth in claim 2, further comprising a locking handle, said locking handle adapted to be inserted through an aperture in said body to threadably engage said bushing, so as to lock said bushing into a stationary, working position with respect to said body.

7. The tool as set forth in claims 6, further comprising a drill chuck, and wherein said forming tool further comprises a butt end having a threaded bore therein, and wherein said drill chuck is adapted to be securely inserted into said threaded bore in said butt end of said forming tool.

8. The tool as set forth in claim 1, wherein said body further comprises a first interior circumferential groove, and further comprising a first snap ring adapted to securely fit into said first interior circumferential groove.

9. The tool as set forth in claim 8, wherein said jam nut assembly case further comprises a second interior circumferential groove, and wherein said tool further comprising a second snap ring adapted to securely fit into said second interior circumferential groove in said jam nut assembly case.

10. The tool as set forth in claim 9, further comprising a washer between said first snap ring and said first collet.

11. The tool as set forth in claim 9, further comprising an L-shaped ringlike inner retainer between said second collet and said second snap ring.

12. The tool as set forth in claim 11, further comprising a bearing between said L-shaped ringlike inner ring retainer and said second snap ring.

13. The tool as set forth in claim 12, wherein said bearing comprises a first bearing race, a thrust bearing, and a second bearing race.

14. The tool as set forth in claim 12, further comprising a L-shaped ringlike outer retainer between said bearing and said second snap ring.

\* \* \* \* \*